Sept. 2, 1924.
W. M. HUTCHISON
MOTOR CONTROL SYSTEM
Filed Sept. 8, 1921
1,506,754
2 Sheets-Sheet 1
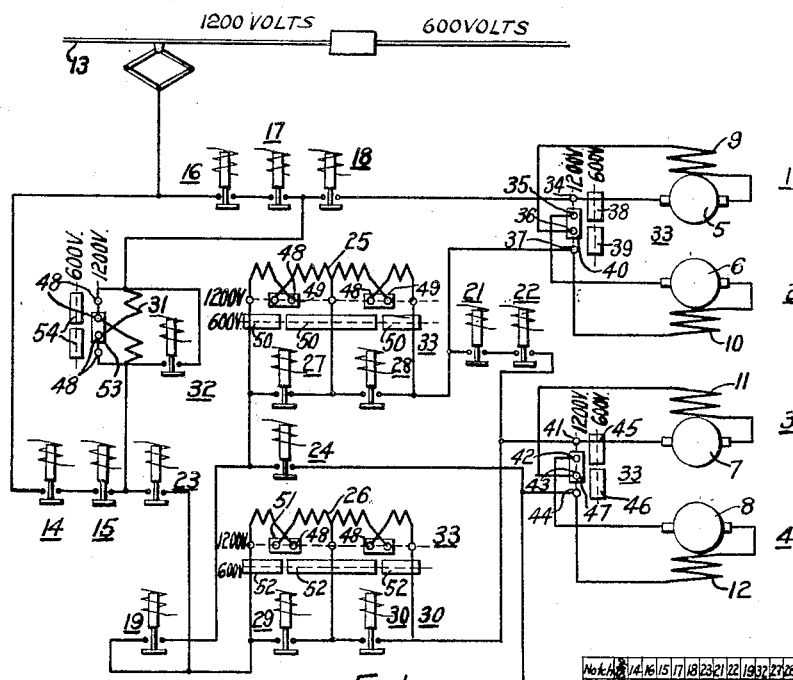
WITNESSES:
C. G. Schiefelbein
H. C. Lowe
INVENTOR
William M. Hutchison.
BY
Wesley G. Carr
ATTORNEY Sept. 2, 1924.

W. M. HUTCHISON

MOTOR CONTROL SYSTEM

Filed Sept. 8, 1921

WITNESSES:

INVENTOR
William M. Hutchison
BY
ATTORNEY

Patented Sept. 2, 1924.

1,506,754

UNITED STATES PATENT OFFICE.

WILLIAM M. HUTCHISON, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed September 8, 1921. Serial No. 499,226.

*To all whom it may concern:*

Be it known that I, WILLIAM M. HUTCHISON, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to control systems for governing a plurality of motors that may be energized from several different sources of electrical energy to drive a railway vehicle.

One object of my invention is to provide an improved control system for operating a plurality of motors which may be energized from different sources of electrical energy at different periods of time.

Another object of my invention is to provide automatic means for protecting the motors of a car, when the motors are connected to a source of electrical energy of higher potential than that with which they have previously been associated and to provide means for automatically resetting the protective device as soon as the relation of the motors has been changed to permit successful operation thereof from the source of higher potential.

Briefly speaking, my invention consists in providing a switch for governing the energization of the actuating coils of a plurality of switches that control the operation of the main motors and in providing a relay device for automatically controlling the opening and closing of this switch in accordance with the voltage of the electrical energy that is supplied to the driving motors.

For a better understanding of my invention, reference may be made to the accompanying drawing, Figure 1 of which is a diagrammatic view of a control system, for a plurality of motors, that embodies my invention;

Fig. 2 is a diagrammatic view of the auxiliary control system for governing a plurality of switches that are illustrated in Fig. 1;

Fig. 3 is a sequence chart showing the order of closure of the main switches that are illustrated in Fig. 1;

Fig. 4 is a view, in side elevation, of a portion of a change over switch employed in the control system illustrated in Fig. 1.

Figure 5:
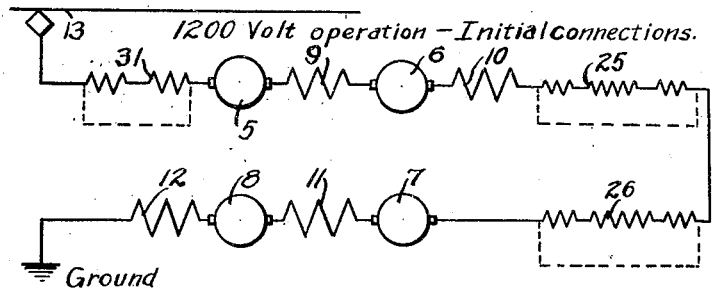
Fig. 5 to Fig. 8, inclusive, are simplified diagrammatic views of the main circuit connections that are employed under various operating conditions in conjunction with my present invention.

The motor-control system that is illustrated in Fig. 1 comprises a plurality of motors 1 to 4, inclusive, respectively, having armatures 5 to 8, inclusive, and corresponding field-magnet windings 9 to 12. The motors 1 to 4, inclusive, may be energized by a suitable source of electrical energy, such, for example, as a trolley conductor 13 and a return circuit marked "Ground." A plurality of line switches or circuit-breakers 14 to 17, inclusive, are employed for respectively connecting the motors 1 to 4 to the trolley-conductor 13. A plurality of contactors 18, 19 and 21 to 24, inclusive, are employed for connecting the motors 1 to 4, inclusive, in series and in parallel relation.

A plurality of starting resistors 25 and 26 may be shunted by means of the contactors 27 and 28, and 29 and 30, respectively. A starting resistor 31 may be shunted by a contactor 32. A change over switch 33 is provided with a plurality of operating positions respectively corresponding to 600-volt and 1200-volt operation of the motors. It is to be understood that these voltages are taken for the purpose of illustration only and may be any other values that operating conditions require.

The change over switch 33 is provided with a plurality of control fingers 34 to 37, inclusive, which may be engaged by contact segments 38 to 40, inclusive, to connect the motors 1 and 2 in series and in parallel relation, and is further provided with a plurality of control fingers 41 to 44, inclusive, which may be engaged by the contact segments 45 to 47, inclusive, to connect the motors 3 and 4 in series and in parallel relation, according to whether the motors 1 to 4, inclusive, are energized from the 1200-volt or the 600-volt supply circuit.

The change over switch 33 is also provided with a plurality of control fingers 48 to be engaged by a plurality of contact segments 49 to 54, inclusive, for connecting portions of the starting resistors 25, 26 and 31 in series and in parallel relation, respectively, with corresponding portions of the same resistors, in accordance with the voltage that is applied to the motors 1 to 4, inclusive.

Referring to Fig. 2 of the drawing, a controller 57 having an "Off" position and a plurality of operating positions 1' to 4', inclusive, is provided with a plurality of control fingers 58 to 66, inclusive, which may be engaged by contact segments 67 to 70, inclusive, in a manner hereinafter more fully described.

A motor-generator set or dynamotor 71, comprising a motor 72 and a generator 73, having armatures 74 and 75, respectively, and corresponding series field-magnet windings 76 and 77, is employed for changing the voltage from 1200 volts to 600 volts to energize the actuating coils of the switches that are illustrated in Fig. 1. The generator 73 is also provided with a shunt field-magnet winding 78.

A changeover master switch 80, having an "Off" position, a 1200-volt position and a 600-volt position, is employed for governing the energization of a plurality of actuating coils 81 and 82, which control the movement of the changeover switch 33 (see Fig. 4 of the drawing). A switch 83 is provided to govern the energization of the auxiliary circuits comprising the actuating coils of the main switches, car lights, and the like.

A relay device 84 for governing the switch 83 is provided with an actuating coil 84a and a holding coil 84b, which may be energized from an auxiliary resistor 85. A plurality of switches 86 to 89, inclusive, are employed for manually connecting various lighting, heating and other auxiliary circuits to a source of energy.

The changeover switch 33 should be actuated to either its 600 or 1200 volt position, at a period when the motors 1 to 4, inclusive, are energized from a portion of the trolley conductor 13 having a potential of 600 volts. The actuating coil 81 of the changeover switch 33 is energized when the master changeover switch 80 occupies its 1200 volt position by a circuit that is established from the trolley conductor 13 through switch 90, control fingers 91 and 97, which are bridged by contact segment 99 of the changeover switch 33, switches 83 and 86, blowout coil 106 of the master changeover switch 80, control fingers 107 and 116, which are bridged by contact segment 117, auxiliary control resistor 117a, actuating coil 81 of the changeover switch 33, control fingers 118 and 119, which are bridged by contact segment 120 of the changeover switch 33, and interlock 15-out to Ground.

If the changeover switch 33 occupies its 1200 volt position and the master changeover switch 80 is actuated to its 600 volt position, a circuit is established from the trolley conductor 13 through switch 90, control fingers 91 and 92, which are bridged by contact segment 93, armature 74 and field-magnet winding 76 of the motor 72, control fingers 95 and 97, which are bridged by contact segment 96, switches 83 and 86, blowout coil 106 of the master changeover switch 80, control fingers 107 and 121, which are bridged by contact segment 122, auxiliary control resistor 123, actuating coil 82 of the changeover switch 33, control fingers 119 and 124, which are bridged by contact segment 120 and interlock 15-out to Ground.

When the coil 82 of the main changeover switch 33 is energized, the switch 33 is actuated to its 600 volt position.

If the switch 83 occupies its open position, because the changeover switch 33 occupied its 600 volt position, when the control system was energized by a current of 1200 volts potential, the switch 33 of the first car is actuated manually or pneumatically to its 1200 volts position, thereby starting the motor generator set 72 to operate. The changeover switches 33 of the other cars in a train (not shown) may be governed by the master changeover switch 80.

The operation of the control system is begun by actuating a manually operable switch 90 to its closed position. If the changeover switch 33 occupies its 1200-volt position, as illustrated, a circuit is established from trolley-conductor 13 through manually operable switch 80, control fingers 91 and 92, which are bridged by contact segment 93, armature 74 and series field-magnet winding 76 of the motor 72 of the motor-generator set 71, control fingers 94 and 95, which are bridged by contact segment 96 of the changeover switch 33, series field-magnet winding 77 and the parallel circuit comprising shunt field-magnet winding 78 and armature 75 of the generator 73, to Ground.

The voltage across the motor 72 and generator 73 is thus 1200 volts and the machines are so designed that they each take 600 volts, thereby making the potential of the contact segment 96 of the changeover switch 33 equal to 600 volts.

A circuit is provided from the contact segment 96 through control finger 97 and resistor 85 to Ground. Upon the energization of the resistor 85, current is supplied from the tap 98 thereof through the contact members of the relay device 84, actuating coil of the switch 83 and the actuating coil 84a of the relay device 84, which coils are connected in parallel relation, to Ground. The switch 83 will assume its closed position upon energization of its actuating coil. The relay device 84 will remain in its lower position unless the voltage across the terminals of the actuating coil 84a is greater than any selected setting or value between 600 and 1200 volts, such, for example, as 750 volts.

If a potential of 600 volts is to be impressed upon the trolley-conductor at starting, the changeover switch 33 is first actuated to its 600-volt position and current is supplied from the trolley-conductor 13 through manually-operated switch 90, control fingers 91 and 97 of the changeover switch 33, which are bridged by contact segment 99, and control resistor 85 to Ground.

When the switch 83 has assumed its closed position, the switches 86 to 89, inclusive, may be closed manually to energize the various auxiliary circuits, such as the car lights and circuits for energizing the actuating coils of the switches that are illustrated in Fig. 1.

A relay device 101 which is governed by the pressure of air in a suitable reservoir, is provided for governing the energization of the motor 72, when it is operating on 600 volts solely to operate an air compressor (not shown). When the air pressure that actuates the brake mechanism falls below a predetermined value, the pressure relay 101 assumes its closed position, thereby establishing a circuit from the trolley-conductor 13 through manually-operated switch 90, control fingers 91 and 97 of the changeover switch 33, contact segment 99, switch 83, compressor relay 101, control fingers 102 and 92, which are bridged by contact segment 103 of the changeover switch 33, armature 74 and series field-magnet winding 76 of the motor 72 and control fingers 95 and 104 of the changeover switch 33 which are bridged by contact segment 105, to Ground.

The air compressor is mechanically connected to the motor 72 of the motor-generator set 71 and is driven thereby. The air compressor supplies fluid pressure for actuating the switches and the brakes. When the air pressure within the reservoir increases above a predetermined value, the compressor relay 101 is opened, thereby de-energizing the motor 72. When the switches 83 and 86 are closed, the control finger 63 of the controller 57 is energized by a circuit that extends from switch 83 through switch 86, blow-out coil 106, and control fingers 107 and 108 of the changeover master switch 80, which are bridged by contact segment 109, to control finger 63, thereby furnishing a positive terminal from which the control fingers 58 to 66, inclusive, of the master controller 57 may be energized upon its being actuated through its various positions, 1', 2', 3' and 4'.

An auxiliary resistor 110 is provided for energizing the actuating coils of the main switches, in accordance with a familiar practice.

The auxiliary circuits for governing the actuating coils of the contactors shown in Fig. 1 have not been shown beyond the control fingers of the controller 57, as their construction and arrangement are well understood in the art. The order of closure of the contactors and line switches that are illustrated in Fig. 1 of the drawing is set forth in the sequence chart of Fig. 3. The various main circuits will not be described, except to say that when the motors are operated at 1200 volts, which condition corresponds to the illustrated position of the changeover switch 33, and when the controller 57 occupies its first position, 1', the four motors 1, 2, 3 and 4 are connected in series relation with the starting resistors 25, 26 and 31 across the supply circuit (see Fig. 5).

Figure 6:
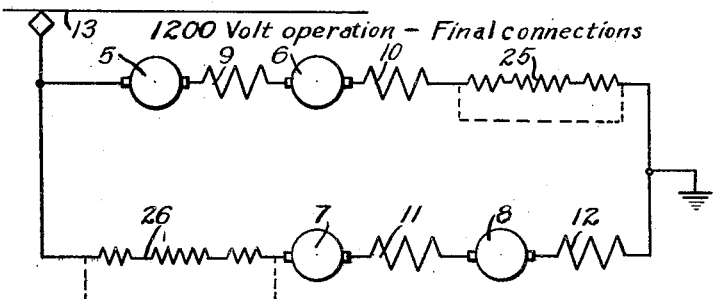

In notch 2' of the controller 57, the starting resistors 25, 26 and 31 are shunted by the contactors 27 to 30, inclusive, and 32, as indicated by the dotted lines in Fig. 5. In notch 3' of the controller 57, the motors 1 and 2 are connected in series relation with the starting resistor 25 between the trolley-conductor 13 and Ground, while the motors 3 and 4 are connected in series relation with the starting resistor 26 between the trolley 13 and Ground. (See Fig. 6). In notch 4', the starting resistors 25 and 26 are shunted, as indicated by the dotted lines in Fig. 6, leaving the motors 1 and 2 in series relation with each other and in parallel relation to the motors 3 and 4, which are also connected in series relation one with the other.

When the trolley-conductor 13 has impressed upon it a potential of 600 volts, the motors 1 and 2 are first connected in parallel relation by reason of the changeover switch 33 being actuated to its 600-volt position, thereby causing the pairs of control fingers 34 and 35 and 36 and 37 to be bridged by the contact segments 38 and 39, respectively. The motors 3 and 4 are likewise connected in parallel relation by reason of the pairs of control fingers 41 and 42 and 43 and 44 of the changeover switch 33 being engaged by contact segments 45 and 46, respectively. Portions of the starting resistors 25, 26 and 31 are connected in parallel relation by reason of the control fingers 48 of the changeover switch 33 being respectively engaged by corresponding contact segments 50, 52 and 54 to reduce the ohmic value of the resistors 25, 26 and 31 to one-fourth the value they have when the system is energized at a potential of 1200 volts.

The sequence of operation for the switches that govern the motors 1 to 4 is the same for 600 volts, as for 1200 volts, the motors 1 and 2 being initially connected in parallel relation one to the other and in series relation with the motors 3 and 4, which are also connected in parallel relation one to the other, the starting resistors 25, 26 and 31 being connected in series relation with the pairs of motors. (See Fig. 7).

Figure 7:
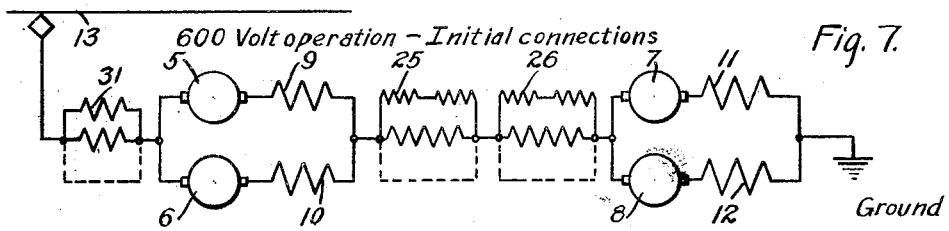

The starting resistors 25, 26 and 31 are shunted when the controller 57 is actuated to positions 2', as indicated by the dotted lines in Fig. 7. Upon the controller being notched to position 3', the pair of motors 1 and 2 is connected in parallel relation to the pair of motors 3 and 4, and the starting resistors 25 and 26 are connected in series relation with the corresponding pairs of motors. (See Fig. 8).

Figure 8:
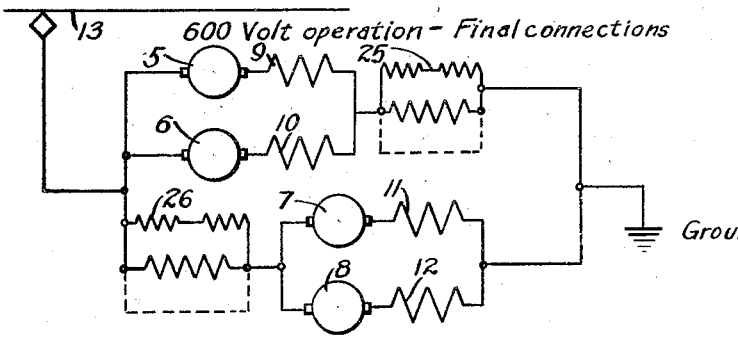

When the controller is notched to position 4', the starting resistors 25 and 26 are shunted, as indicated by the dotted lines in Fig. 8, thereby connecting motors 1 to 4, inclusive, in parallel relation directly between the trolley-conductor 13 and Ground.

When the car comes to the portion of the trolley-conductor 13 that is energized at a potential of 1200 volts, the actuating coil 84a of the relay device 84 will be energized sufficiently to actuate the relay 84 to its upper position, thereby de-energizing the actuating coil of the switch 83 and the coil 84a of the device 84.

A holding circuit is provided for preventing the relay device 84 from assuming its lower position. This circuit extends from the tap 107 of the control resistor 85 through the upper contact terminals of the relay device 84 and the holding coil 84b of the relay device 84 to Ground. So long as the voltage across the terminals of the actuating coil 84b is greater than a predetermined value, such, for example, as 750 volts, the relay device 84 will be maintained in open position and thus prevent the closure of the switch 83.

As soon as the switch 83 is opened, all the actuating coils of the switches illustrated by Fig. 1 of the drawing are de-energized, thereby causing the switches to assume their open position. When the line voltage has fallen below a predetermined value, the relay device 84 will assume its lower position and the actuating coil of the switch 83 will be energized to effect closure thereof.

The switch 83 is provided with a dash pot 83a to prevent its closure until after the relay 84 has had time to assume its upper position, in case high voltage is applied to the control system, when the switch 83 is open.

The current traversing the coils of the relay device 84 is reduced when the changeover switch 33 is actuated from its 600-volt to its 1200-volt position, as has been previously described.

A low-voltage relay 112 is provided for opening the circuit-breakers 14 to 17, inclusive, upon the failure of power, or upon the car coming upon a portion of the trolley conductor 13, which is energized at 600 volts potential, when the relay 112 is set to operate under 1200 volt conditions. A resistor 113 is connected in series relation with the actuating coil of the relay 112, when the control system is subjected to current of 1200 volts potential. When the changeover switch 33 occupies its 600-volt position, contact segment 114 bridges a plurality of control fingers 115 to shunt the resistor 113.

If the energization of the control system is suddenly reduced from 1200 volts to 600 volts, the low-voltage relay 112 will assume its open position to de-energize the control system. The relay 112 will automatically close, when the changeover switch 33 is actuated to its 600-volt position.

From the above description, it is apparent that I have provided a control system for a plurality of motors that are operated at different periods from sources of energy of different potentials, whereby the system is automatically protected from over-voltage and under-voltage conditions and upon discontinuance of such abnormal condition, the protective device corresponding to that abnormal condition automatically assumes its first position.

In other words, when the control system suddenly becomes energized at a potential of 1200 volts, the protective relay device 84 operates to open the switch 83. It is necessary for the operator to return the controller 57 to the "Off" position, operate the changeover master switch 80 to effect movement of the changeover switch 33 to its 1200-volt position, and then manually actuate the controller 57 to its various running positions. It is not necessary for the operator to perform any manual operation to reset the relay device 84.

Likewise, when the control system has been energized at a potential of 1200 volts and is then energized at a potential of 600 volts, the low-voltage relay 112 will assume its open position. As soon as the changeover switch 33 is actuated to its 600-volt position, the relay 112 will close.

While I have shown my invention in the preferred form, it is apparent that minor modifications may be made in the arrangement of circuits and in the apparatus employed, without departing from the spirit of my invention. I desire, therefore, to be limited only by the scope of the appended claims.

I claim as my invention:

1. In a control system, the combination with a translating device and means for supplying current to said device, of a relay device for automatically rendering said means inoperative during abnormal voltage conditions and for rendering said means operative upon the cessation of said abnormal conditions.

2. In a control system, the combination with a translating device and a source of electrical energy, of a switch having an actuating coil for connecting said source to said device, and automatic means for de-energizing said coil upon the voltage from said source becoming greater than a predetermined value and for re-energizing said coil upon the cessation of said abnormal voltage.

3. In a control system, the combination with a translating device, and a source of electrical energy, of a switch for connecting said device to said source and means comprising a relay device having a plurality of coils for governing said switch, said relay device being actuated to its open position by one of said coils upon the occurrence of abnormal voltage conditions and being maintained in its open position by the other of said coils so long as said abnormal conditions continue.

4. In a control system, the combination with a translating device and a source of electrical energy, of a switch for connecting said device to said source and means comprising a relay device having a plurality of positions for governing said switch, said device assuming one position to open said switch upon the occurrence of over-voltage conditions and assuming another position to close said switch upon a cessation of said abnormal conditions.

5. In a control system, the combination with a translating device, a plurality of sources of electrical energy, and a plurality of switches having actuating coils for governing said device, of a dynamo-electric machine for supplying energy to said coils upon said device being connected to one of said sources, and automatic means for connecting said coils to one of said sources so long as said device is energized by the same source.

6. The combination with a plurality of motors, a relatively low-voltage source of energy and a relatively high-voltage source of energy, of a changeover switch having a plurality of positions for connecting said motors in different relations in accordance with the source to which said motors are connected, a switch having an actuating coil for governing the energization of said motors and means comprising a relay device for de-energizing said coil upon said motors becoming energized from said high-voltage source and automatic means for rendering said device inoperative after said changeover switch has been actuated to another position.

7. In a control system, the combination with a plurality of motors, of means for connecting said motors in different relations during acceleration thereof, a plurality of sources of voltage, a changeover switch having a plurality of positions for connecting said motors in different relations to correspond with the different sources of voltage, and automatic means for de-energizing said motors upon said system becoming energized by a different one of said sources, said means becoming inoperative upon said changeover switch being actuated to a position corresponding to said different source.

8. In a control system, the combination with a plurality of motors and sources of energy at different voltages, of a changeover switch for connecting certain of said motors in series and in parallel relation, a plurality of switches having actuating coils for connecting groups of said motors in series and in parallel relation, a dynamo-electric machine for translating said energy, an auxiliary switch for connecting said actuating coils to said machine upon said motors being energized from one source of energy and for connecting said coils to a source of energy at lower voltage upon said motors being energized from the latter source, and means comprising a relay device for governing said auxiliary switch for automatically opening said switch upon the motors being energized from a source of higher voltage and for closing said switch upon said changeover switch being actuated to the position corresponding to said source of higher voltage.

9. In a control system, the combination with a plurality of motors and relatively high and low voltage sources of energy, of means comprising a changeover switch having a plurality of positions for connecting said motors in different relations to correspond to said sources, automatic means for de-energizing said system upon said motors becoming energized from the source of low voltage and automatic means for de-energizing said motors upon said system becoming energized from the source of higher voltage, both of said automatic means being rendered inoperative upon said changeover switch being actuated to another position.

10. In a control system, the combination with a plurality of motors and relatively high and low voltage sources of energy, of means comprising a changeover switch having a plurality of positions for connecting said motors in different relations to correspond to said sources, a controller for governing the speed of said motors and automatic means for de-energizing said system upon the position occupied by said changeover switch differing from that corresponding to the source of energization, said means being automatically set to correspond to the change in voltage upon said changeover switch being actuated to its corresponding position.

11. In a control system, the combination with a translating device and a source of electrical energy, of a switch for connecting said device to said source, means comprising a relay device having a plurality of coils for governing said switch, said relay device being actuated to its open position by one of said coils upon the occurrence of abnormal voltage conditions and being maintained in its open position by the other of said coils so long as said abnormal voltage conditions continue, and means for preventing said switch from closing simultaneously with said device assuming its open position.

12. In a control system, the combination with a switch having an actuating coil, of a relay device for governing the energization of said coil, said relay device having an actuating coil and a holding coil, means for energizing said actuating coils of said switch and said device simultaneously, and means for retarding the operation of said switch to prevent its closure upon the opening of said device.

13. In a control system, the combination with a switch having an actuating coil, of a relay device for governing the energization of said coil, said relay device having an actuating coil and a holding coil, means for energizing the actuating coils of said switch and said device simultaneously, and means for retarding the operation of said switch to prevent its closure simultaneously with said device assuming its open position.

14. In a control system, the combination with a translating device and a source of electrical energy, of means for connecting said device to said source, and automatic means for effecting an opening of said connecting means when the voltage from said source differs from a certain value and for effecting the closure of said connecting means upon a return of the voltage to said value.

In testimony whereof, I have hereunto subscribed my name this 31st day of August 1921.

WILLIAM M. HUTCHISON.